(12) United States Patent
Fischbach et al.

(10) Patent No.: US 8,436,730 B2
(45) Date of Patent: *May 7, 2013

(54) METHOD AND SYSTEM FOR TRACKING AND/OR DISABLING A VEHICLE

(75) Inventors: Trevor A. Fischbach, Martinsville, NJ (US); P. Sean Sawyer, Virginia Beach, VA (US); Amanda D. McCall, Virginia Beach, VA (US)

(73) Assignee: SC Holdings, LLC, Virginia Beach, VA (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/169,810

(22) Filed: Jun. 27, 2011

(65) Prior Publication Data

US 2012/0166021 A1 Jun. 28, 2012

Related U.S. Application Data

(63) Continuation-in-part of application No. 12/287,124, filed on Oct. 6, 2008, now Pat. No. 7,990,265.

(60) Provisional application No. 60/997,677, filed on Oct. 4, 2007.

(51) Int. Cl.
*G08B 1/08* (2006.01)

(52) U.S. Cl.
USPC .................. 340/539.13; 340/539.1; 340/990; 340/572.4; 340/572.1; 701/101; 701/213

(58) Field of Classification Search ............... 340/539.1, 340/539.13, 990, 572.4; 701/101, 213
See application file for complete search history.

(56) References Cited

U.S. PATENT DOCUMENTS

| | | | |
|---|---|---|---|
| 4,065,753 A | 12/1977 | Paul, Jr. |
| 4,908,629 A | 3/1990 | Apsell et al. |
| 4,988,994 A | 1/1991 | Loeven |
| 5,018,450 A | 5/1991 | Smith |
| 5,023,809 A | 6/1991 | Spackman et al. |
| 5,155,689 A | 10/1992 | Wortham |
| 5,161,632 A | 11/1992 | Asayama |
| 5,369,590 A | 11/1994 | Karasudani |
| 5,490,075 A | 2/1996 | Howard et al. |
| 5,503,059 A | 4/1996 | Pacholok |
| 5,587,715 A | 12/1996 | Lewis |
| 5,611,408 A | 3/1997 | Abukhader |
| 5,682,133 A | 10/1997 | Johnson et al. |

(Continued)

FOREIGN PATENT DOCUMENTS

WO    WO 98/30421    7/1998

OTHER PUBLICATIONS

Technology Beat, New Technologies Demonstrated for Law Enforcement, Nat'l Institute of Justice, "Fleeing Vehicle Tagging System,", Sep. 1995, p. 2, 1st column.

*Primary Examiner* — Daniel Wu
*Assistant Examiner* — Son M Tang
(74) *Attorney, Agent, or Firm* — Williams Mullen

(57) ABSTRACT

A system for disabling a fleeing vehicle via disrupting the vehicle's onboard computer or electrical system. The system optionally includes a tracking system for tracking the vehicle's location and/or a remote sensing system for identifying a payload contained in the vehicle or asset. A launcher of the disabling/tracking device may be handheld or vehicle mounted, and may use high pressure gas or another propellant to launch the projectile at a fleeing vehicle. The system may include a tether for connecting the disabling device to a power supply disposed on a pursuit vehicle or a handheld launcher.

11 Claims, 8 Drawing Sheets

U.S. PATENT DOCUMENTS

| | | |
|---|---|---|
| 5,731,785 A | 3/1998 | Lemelson et al. |
| 5,839,759 A | 11/1998 | Trigo |
| 5,861,799 A | 1/1999 | Szwed |
| 5,892,441 A | 4/1999 | Woolley et al. |
| 5,952,600 A | 9/1999 | Herr |
| 6,052,068 A | 4/2000 | Price R-W et al. |
| 6,072,248 A | 6/2000 | Muise et al. |
| 6,135,226 A | 10/2000 | Persichini et al. |
| 6,176,519 B1 | 1/2001 | Limingoja |
| 6,246,323 B1 | 6/2001 | Fischbach |
| 6,371,000 B1 | 4/2002 | Hutmacher et al. |
| 6,470,260 B2 | 10/2002 | Martens et al. |
| 6,505,101 B1 | 1/2003 | Brill |
| 6,512,478 B1 | 1/2003 | Chien |
| 6,523,478 B1 | 2/2003 | Gonzalez et al. |
| 6,650,283 B2 | 11/2003 | Brydges et al. |
| 7,049,709 B2 | 5/2006 | Boggs |
| 7,061,374 B2 | 6/2006 | Waterman |
| 7,207,274 B1 | 4/2007 | Plew et al. |
| 7,246,613 B1 | 7/2007 | Mohar |
| 7,275,889 B1 | 10/2007 | McGill |
| 7,412,321 B2 | 8/2008 | de Sylva |
| 7,453,356 B2 | 11/2008 | Bedenko |
| 7,518,489 B2 | 4/2009 | Nelson et al. |
| 7,573,373 B2 | 8/2009 | Nguyen |
| 7,690,304 B2 | 4/2010 | Roemerman et al. |
| 7,760,076 B2 | 7/2010 | Boggess |
| 7,824,126 B2 | 11/2010 | Costa |
| 7,990,265 B2 | 8/2011 | Fischbach et al. |
| 2006/0001531 A1 | 1/2006 | Waterman |

METHOD AND SYSTEM FOR TRACKING AND/OR DISABLING A VEHICLE

CROSS REFERENCE TO RELATED APPLICATIONS

This application is a Continuation-in-Part of U.S. application Ser. No. 12/287,124 filed Oct. 6, 2008 now U.S. Pat No. 7,990,265, which is related to and claims the benefit of U.S. Provisional Patent Application Ser. No. 60/997,677, filed on Oct. 4, 2007, incorporated herein by reference.

FIELD OF THE INVENTION

The present invention is directed to a tracking, sensing and/or disablement system for a moving or fixed target, typically, but not limited to a fleeing vehicle. Specifically, the present invention is directed to a system which remotely tracks a vehicle with a location module, scans the vehicle for contraband substances and/or electronically disables the vehicle.

BACKGROUND OF THE INVENTION

Terrorist attacks around the world have reshaped ways of behavior, including the way governments view threats to freedom nationally and internationally. Anti-terrorism intelligence is a high priority for many nations. Being able to simply gather conventional intelligence is not good enough. These national threats use tactics that demand real-time tracking and information gathering capabilities which would include an arsenal of remote sensing and intelligence gathering instruments to identify and engage these threats to our freedom. The timely handling of this critical data therefore ensures a quick response from government agencies and municipalities that deploy these tools. The goal is to detect and thwart attempts to attack from these elements that range from explosive, biochemical, nuclear, or other means.

Technical innovations through aggressive funding from both the government and private sectors has fueled the remote sensing industry to miniaturize these vital components to our national security and make them readily available in the commercial market.

The need to be able to know the whereabouts of suspicious vehicles/assets and remotely test them for contraband would provide law enforcement and homeland security with added measures to proactively search for these threats and engage them if necessary.

The present invention provides a method and system to "tag" a fleeing or stationary "target," such as a vehicle, by attaching a tracking device, a sensor device/s, and/or a vehicle disabling system to the target from a distance and then monitoring the location of that target without constant visual contact, thereby minimizing the risk to bystanders and the individuals involved in the pursuit.

The present invention additionally provides a method for disabling a vehicle either remotely or automatically upon the vehicle achieving a predetermined condition such as dropping below a selected speed.

The present invention further provides a method for scanning a vehicle or fixed target for trace elements of interest including, but not limited to, explosives, IEDs, Weapons of Mass Destruction, and/or contraband.

BRIEF SUMMARY OF THE INVENTION

Accordingly, an embodiment of the present invention is a method for tagging and tracking a target vehicle for the purpose of gathering sensor based information and deploying an electrical charge to incapacitate the vehicle, the method comprising providing a launcher having at least one barrel, a carrier having an electronics package, and sufficient propellant to launch the carrier from the launcher in order to affix the carrier to a fixed or moving target at a predetermined range, the carrier electronics package having a tracking system, at least one sensor, and a vehicle stopping system; sighting the target vehicle using a target acquisition device; launching the carrier from the launcher towards the target vehicle; attaching the carrier, with the electronics package within the carrier, to the target vehicle, thereby tagging the target vehicle; and causing a tracking signal to be emitted from the tracking system. Optionally, this method may include the steps of receiving the tracking signal emitted by the tracking means, the tracking signal including information identifying the electronics package, location, and any sensor data; converting the received tracking signal into an image of the tagged target vehicle and sensor data; and determining the need to stop the vehicle based on target vehicle characteristics determined from the tracking signal. This may include displaying the image on a display system, the image representing the location of the tagged target vehicle and sensor data identifying a payload of the vehicle; and providing a remote actuator for remotely stopping the vehicle using the vehicle stopping system.

Alternatively, the method may include receiving the tracking signal and sensor data at a static location using a computer system selected from the group of static computer, networked computer, mobile computer, handheld computing device, and cellular phone. The target vehicle may vary widely, including items or vehicles selected from the group of an automobile, a trailer, a trailer attached to a tractor trailer truck, a boat, an aircraft, a military vehicle, a motorcycle, an off terrain vehicle. Of course, vehicles that are stationary should be included within the meaning.

As an additional option, the method may involve a tracking signal comprises information from a global positioning system, such as Global Positioning Satellite, etc.

An embodiment of the present invention is a tagging device for tagging a target vehicle, the tagging device comprising a tracking chip having a microprocessor, a power source, and an emitting means for emitting a tracking signal, the tracking signal emitted being a unique representation of the tracking chip; a vehicle stopping technology; and an attachment means for attaching the tracking chip and vehicle stopping technology to the target vehicle, the attachment means containing the electronics package therein, such that when the attachment means attaches to the target vehicle, the electronics package contained therein is not damaged. Optionally, the attachment means is capable of adhering to the target vehicle, whether by adhesive, magnetic material, etc. The attachment means may optionally have an outer surface.

Optionally, the electronics package may further comprise at least one sensor and a receiving means for receiving an arming signal, with an arming signal causing the electronics package to emit the tracking signal and to transmit sensor data.

Another embodiment or aspect is a tracking system having a tracking device comprising a tracking chip having a microprocessor, an antenna, a power source, and an emitting system for emitting a tracking signal, the tracking signal emitted including a unique representation of the tracking chip; an attachment means for attaching the tracking chip to the target vehicle, the attachment means containing the tracking chip therein, such that when the attachment means attaches to the target vehicle, the electronics package contained therein is not damaged; a launching device having at least one barrel capable of receiving the tracking device, a sighting device, a rangefinder, a source of pressure to expel the tracking device from the barrel; a receiver system comprising a receiver capable of receiving the tracking signal and an interpretation device for interpreting the received tracking signal to identify the tracking chip and to indicate the location of the tracking chip such that when the tracking device is adhered to a target vehicle the tracking signal represents the location of the tagged target vehicle; a display in communication with the receiver system and responsive to the interpreted tracking signal from the receiver system so as to provide a visual image of the location of the target vehicle; and a controller system having a controller, an input device, and a transmitter, the controller system in communication with the receiver system, capable of actuating the tracking system.

Optionally, the controller system may further comprise an actuator for arming the tracking device and a firing means for firing the tracking device, the actuator adapted, upon launching of a tracking device from the launching device, to cause the tracking device to emit the tracking signal.

Another embodiment of this system is one wherein the tracking device further comprises at least one onboard data gathering sensor to detect substances, the sensor being in communication with the emitting system for inclusion of sensor data within the tracking signal; wherein the at least one onboard data gathering system is contained within the attachment means; wherein the interpretation device is adapted to interpret sensor data; and further wherein the display is in communication with the receiver system and responsive interpreted sensor data to provide a visual image of the sensor data.

Another embodiment of this system is one wherein the tracking device further comprises a vehicle stopping device that discharges electricity to incapacitate the vehicle; wherein the vehicle stopping device is contained within the attachment means; wherein the controller system is further capable of transmitting a disabling signal to activate the vehicle disabling system in response to the receiver system receiving a tracking signal meeting a predetermined set of parameters or in response to a command received from the input device.

An embodiment of the system for the present invention is for tagging, tracking, sensing data from, and disabling a target vehicle, the system comprising a tracking device comprising a tracking chip having a microprocessor, an antenna, a power source, and an emitting system for emitting a tracking signal, the tracking signal emitted including a unique representation of the tracking chip; at least one onboard data gathering sensor to detect substances, the sensor in communication with the emitting system for inclusion of sensor data within the tracking signal; a vehicle stopping device that discharges electricity to incapacitate the vehicle; an attachment means for attaching the tracking chip to the target vehicle, the attachment means containing the tracking chip, sensor, and vehicle stopping device therein, such that when the attachment means attaches to the target vehicle, the electronics package contained therein is not damaged; a launching device having at least one barrel capable of receiving the tracking device, a laser sighting device, a rangefinder, a source of pressure to expel the tracking device from the barrel; a receiver system comprising a receiver capable of receiving the tracking signal and an interpretation device for interpreting the received tracking signal and sensor data to identify the tracking chip and to indicate the location of the tracking chip such that when the tracking device is adhered to a target vehicle the tracking signal represents the location of the tagged target vehicle, and further for interpreting sensor data; a display in communication with the receiver system and responsive to the interpreted tracking signal and sensor data from the receiver system so as to provide a visual image of the location of the target vehicle and sensor data; and a controller system having a controller, an input device, and a transmitter, the controller system in communication with the receiver system, capable of transmitting a disabling signal to activate the vehicle disabling system in response to the receiver system receiving a tracking signal or sensor data meeting a predetermined set of parameters or in response to a command received from the input device.

In another embodiment there is a method for tagging a target vehicle for the purpose of deploying an electrical charge to incapacitate the vehicle by providing a pursuit vehicle with a launcher having at least one barrel, a carrier having an electronics package, a tether having a first end attached to the carrier and a second end attached to the pursuit vehicle. The launcher is configured to launch the carrier in order to affix the carrier to a fixed or moving target at a desired range with the carrier electronics package having a vehicle stopping system. The pursuit vehicle is provided with a power supply configured to supply power to the vehicle stopping system via the tether. When the target vehicle is sighted using a target acquisition device the carrier is launched from the launcher towards the target vehicle. Upon impact with the target vehicle the carrier attaches itself, with the electronics package within the carrier, to the target vehicle, thereby tagging the target vehicle. A remote or direct actuator may be used for stopping the target vehicle using the vehicle stopping system since the vehicle stopping system is configured to discharge electricity to incapacitate the target vehicle.

In yet another embodiment disclosed is a tagging device for tagging a target vehicle having a vehicle stopping technology configured to deliver an electrical charge to incapacitate the target vehicle. There is an attachment means for attaching the tagging device to the target vehicle where the attachment means is configured to be shot from a remote launcher and is capable of adhering to a target vehicle. The attachment means contains an electronics package within, such that when the attachment means attaches to the target vehicle, the electronics package is not damaged. There is a tether for connecting the tagging device to the target vehicle on the first end and to a pursuit vehicle on a second end, the tether is configured to serve as a conduit for electrical power delivered to the vehicle stopping technology from a power supply disposed on the pursuit vehicle. The tagging device is configured to receive a vehicle stopping signal which is transmitted from a remote or direct actuator.

Additionally, an embodiment would have a tracking system having a tracking device with a tracking chip with a microprocessor, an antenna, a power source, and an emitting system for emitting a tracking signal. The tracking signal emitted includes a unique representation or specific signal unique to the tracking chip. There is an attachment means for attaching the tracking device to a target vehicle such that the tracking device is adhered to the target vehicle. The attachment means contains the tracking chip within, such that when the attachment means attaches to the target vehicle, an electronics package contained therein is not damaged. The tracking device further has a vehicle stopping device that discharges electricity to incapacitate the target vehicle. The vehicle stopping device is contained within the attachment means where the tracking device is linked to a pursuit vehicle via a tether. The tether is configured to transmit electrical power to the vehicle stopping device from a power supply located in or on the pursuit vehicle. There is a launching device having at least one barrel capable of receiving the tracking device and a source of pressure to expel the tracking device from the barrel to the target vehicle. There is also a receiver system having a receiver capable of receiving the tracking signal and an interpretation device for interpreting the received tracking signal to identify the tracking chip and to represent the location of the tagged target vehicle. A display in the pursuit vehicle is in communication with the receiver system and responsive to the interpreted tracking signal from the receiver system so as to provide a visual image of the location of the target vehicle and a controller system having a controller, an input device, and a transmitter, where the controller system is in communication with the receiver system. The controller system is capable of transmitting a signal to activate the vehicle stopping device.

An embodiment of the of the tracking device is a system for tagging, tracking, and disabling a target vehicle, the system having a tracking device with a tracking chip that has a microprocessor, an antenna, a power source, and an emitting system for emitting a unique tracking signal representing the tracking chip. There is at least one onboard data gathering sensor to detect substances with the sensor in communication with the emitting system for inclusion of sensor data within the tracking signal. In addition is a vehicle stopping device that discharges electricity to incapacitate the target vehicle and an attachment means for attaching the tracking device to the target vehicle. The attachment means contains the tracking chip, sensor, and vehicle stopping device where the attachment means is capable of adhering to the target vehicle such that when the attachment means attaches to the target vehicle the tracking chip is not damaged. There is a tether for linking the tracking device to a pursuit vehicle with the tether serving as a conduit for the delivery of electrical power to the vehicle stopping device from a power supply disposed on or in the pursuit vehicle. In order to send the vehicle stopping device from the pursuit vehicle to the target vehicle there is a launching device having at least one barrel capable of receiving the tracking device and a source of pressure to expel the tracking device from the barrel. There is a receiver system having a receiver capable of receiving the tracking signal and an interpretation device for interpreting the received tracking signal and sensor data to identify the tracking chip and to indicate the location of the tracking chip such that when the tracking device is adhered to a target vehicle the tracking signal represents the location of the tagged target vehicle and further for interpreting the sensor data. Disclosed is a display in communication with the receiver system and responsive to the interpreted tracking signal and sensor data from the receiver system so as to provide a visual image of the location of the target vehicle and sensor data. There is a controller system having a controller, an input device, and a transmitter, the controller system in communication with the receiver system capable of transmitting a disabling signal to activate the vehicle stopping device in response to the receiver system receiving a tracking signal and sensor data that meet a predetermined set of parameters.

DETAILED DESCRIPTION

Figure 1:
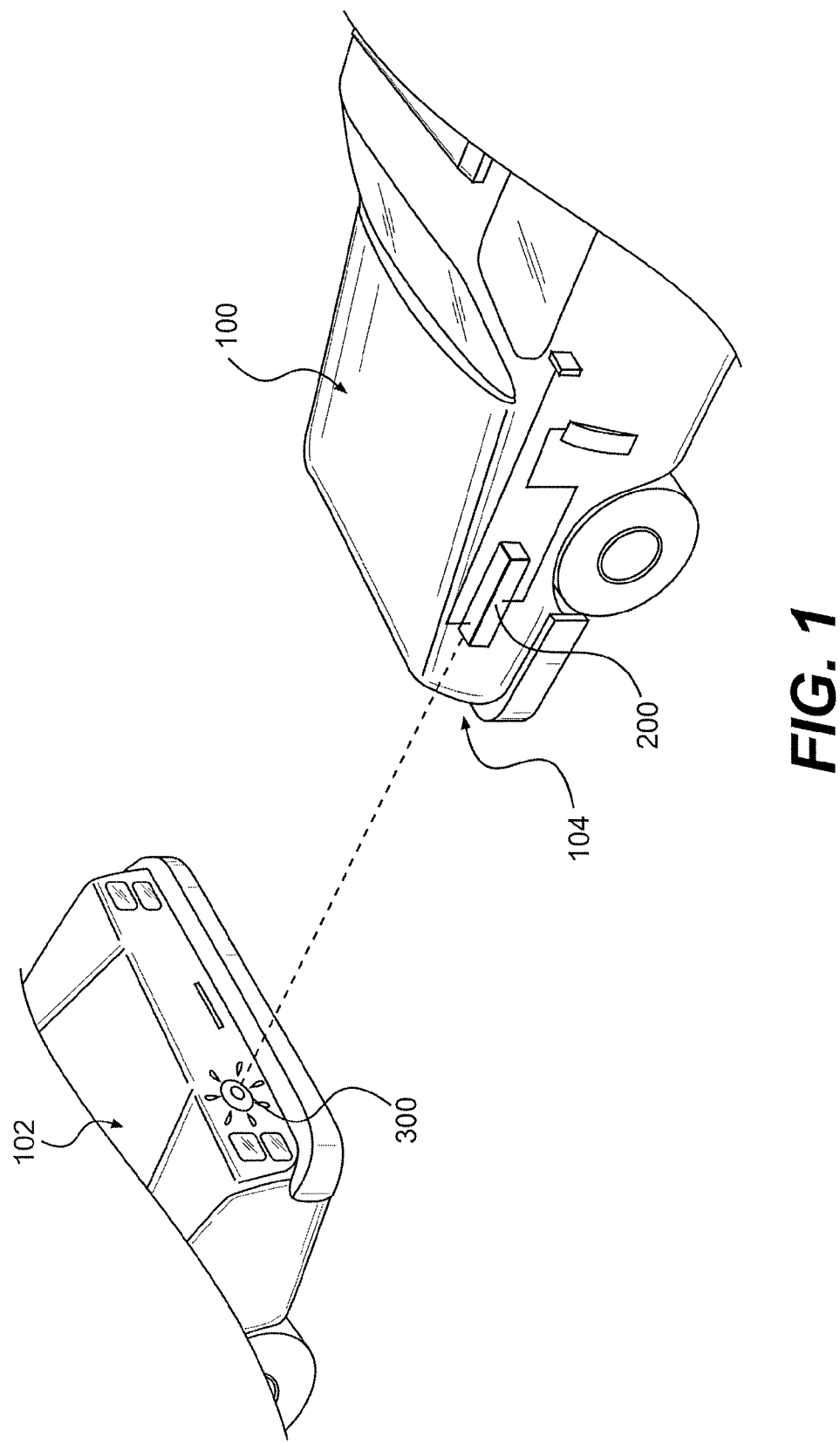
FIG. 1 is a drawing showing a perspective view of a police vehicle firing a tracking projectile, remote sensors and/or vehicle disabling device at a target vehicle.

An aspect of embodiments of the present invention is to provide a method of "tagging" a target vehicle by attaching a tracking device, sensors and/or a vehicle disabling device to it from a distance and then monitoring the location of that target vehicle. The present application hereby incorporates by reference the following issued U.S. patents, (1) U.S. Pat. No. 6,246,323, entitled "Method and System for Tracking a Vehicle" and (2) U.S. Pat. No. 6,650,283, entitled "Vehicular Tracking Device."

Another aspect is to enable the use of a launcher, either handheld or mounted on a vehicle, with single or multiple barrels, to launch a carrier using high pressure air, $CO_2$, gunpowder, electricity, liquid, or solid fuel, or any other method of propulsion to drive the electronics package from the launcher to the stationary target or vehicle.

Another aspect is to provide an apparatus that will cause the attachment to or tagging of a vehicle with a tracking device, sensors and/or vehicle disabling device such that the vehicle may be tracked, the sensors can transmit data concerning substances of interest and a fleeing vehicle may be disabled.

Another aspect is to provide a device that will launch a tracking device from a pursuing vehicle, stationary vehicle, or fixed or mobile position.

Another aspect is to provide a handheld device that will launch a tracking device, remote sensors, and/or vehicle disabling device towards a vehicle or stationary target.

Another aspect is to provide a tracking system whereby the tagged vehicle can be tracked by at least one mobile pursuit vehicle or at least one remote location, or both.

Another aspect is to be able to gather and process information from the sensors in a real-time fashion using an RF link to transmit an identification of the payload onboard the asset. The sensors can test for a wide variety of contraband to ascertain the threat level of the payload.

Another aspect is to provide a means of arresting the vehicle through an electric charge that would bring the vehicle to a stop. The vehicle disabling device would be triggered from either the onboard chipset or from a remote location that communicates with the unit via the RF link or other suitable communication link.

An embodiment of the present invention is capable of tracking, sensing and vehicle disablement system, the system having a launcher that shoots and attaches a projectile to a moving or fixed target, typically, but not limited to a fleeing vehicle. Specifically, the present invention is directed to a system which remotely tracks a vehicle with a location module, and optionally scans the vehicle for contraband substances and/or electronically disables the vehicle.

In addition, the system of the present invention embodies a method of real-time tagging and tracking coupled with at least one data gathering sensors and/or a vehicle stopping system that consists of a launching device, a tracking device, sensing devices, a electromechanical, or electromagnetic vehicle disabling device, and a receiving device to monitor the location of the target and to communicate with the sensors and vehicle disabling device.

Once a target has been tagged and the receiving device has determined the location of the target, the location may be displayed on mapping overlay software. The sensors may test the target for any evidence of explosives, biochemical substances, weapons of mass destruction (WMD), dirty bombs, drugs, or other substances or contraband of interest.

Upon evaluating the need to disable the target of interest, the system can be commanded from a user input or interface on the receiving system to disable the vehicle by incorporating a vehicle stopping or disabling device that emits a power surge with enough energy to disable the target's electronic systems thus bringing the target to a stop if the target is in motion. The system may also be set to disable the vehicle when a particular set of parameters are met i.e. speed, location of the vehicle, geo-fencing, or upon the sensors detecting explosives, WMD, biochemical threats, or improvised explosive device (IED) material.

The data gathering system may contain one or more onboard sensors for detecting trace elements of interest including, but not limited to, biochemical, explosives, IEDs, Weapons of Mass Destruction, dirty bombs, and/or contraband of any kind. The electronics package is equipped with video/audio surveillance components to aid in the detection of these trace elements.

The GPS/A-GPS/RFID or other type of active or inertial location module coupled GSM/CDMA/iDen or other cell or RF communications means, antennas, power supply, adhesive or other means of attachment and a power generating module that are preferably coupled to create a vehicle stopping technology using electromagnetic discharge, electrical burst, or any method of discharging electricity to provide an arresting electric pulse, or discharge to the vehicle's electronic system whether tethered or un-tethered to the launching vehicle.

The electronics package above may be fired from a vehicle mounted or handheld device, with the package achieving stabilized free flight and affixing to the vehicle. The launcher device powers the projectile to the target using methods such as high pressure air, CO2, gunpowder, electricity, liquid or solid fuel, primer, or any other method of propulsion to drive the electronics package from the launcher to the target vehicle.

Either upon launching or when adhered to the target vehicle, the electronics package may transmit location-based and sensor-based data, via an RF link, for example, to a receiving system, which is preferably a data center that extrapolates the incoming data to monitor the vehicle's location. At the same time the RF link is being utilized to transmit data as a result of the sensor operations to detect any form of contraband substance that may be onboard the target vehicle/item of interest.

Once it is deemed necessary to stop the target, the vehicle disabling device can be triggered in a variety of ways. The electrical discharge component may be controlled through, but not limited to, the RF link, or via a suitable communication link reading an optimum heading, speed, location, or advantageous parameter that automatically triggers the discharge to the vehicles electronic system.

Alternatively, the discharge may be triggered remotely through a suitable communications link from a central or mobile location, deploying the electrical discharge to the vehicle's electronics thus incapacitating the potential threat.

Referring now in detail to the drawings, FIG. 1 shows a police vehicle 100 behind a target or suspect vehicle 102. A tracking, sensing and vehicle disabling projectile 300 is fired from a launcher or gun 200 mounted preferably behind the grill 104 of the police car 100 and strikes the rear of the target vehicle 102. The tracking, sensing, and vehicle disabling projectile 300 is fired at a velocity such that it shatters upon impact with the target vehicle 102, as discussed in further detail herein.

Figure 2:
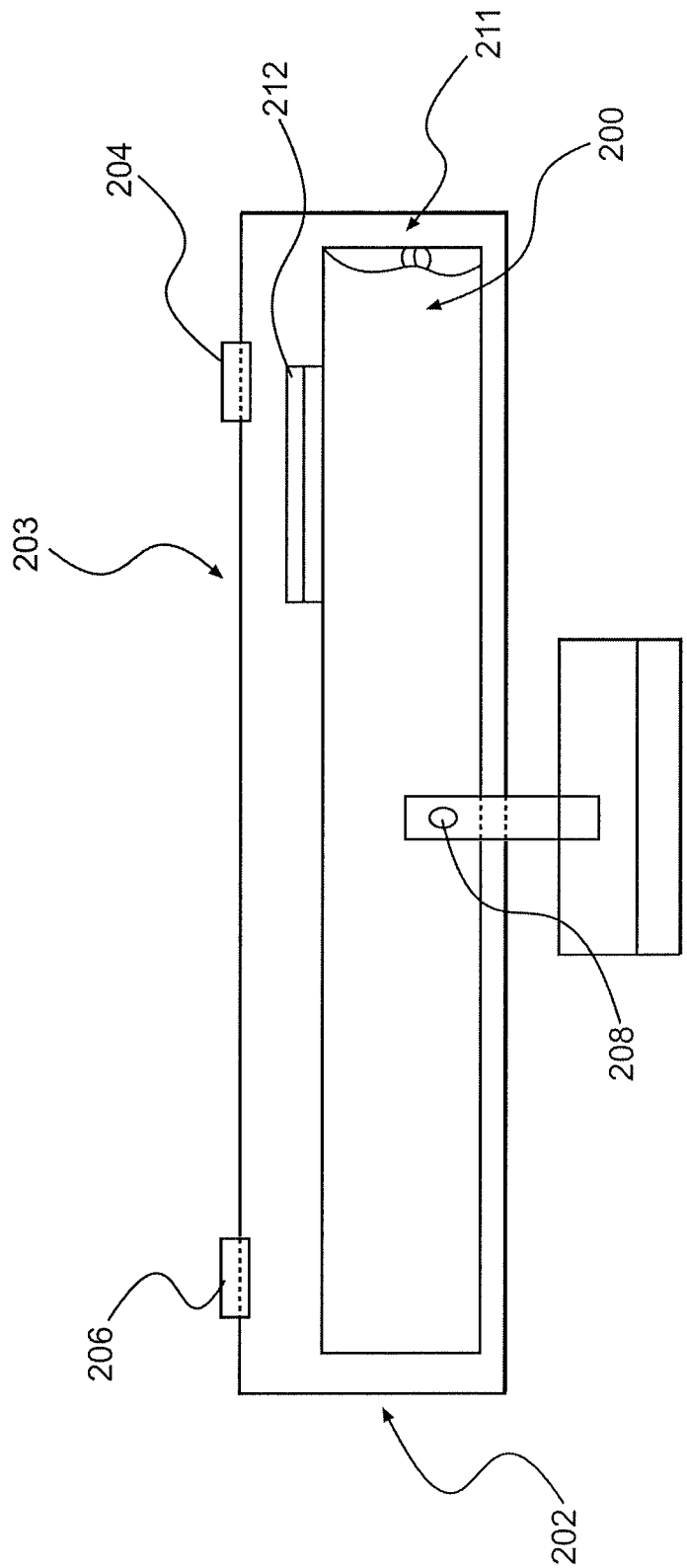
FIG. 2 is a drawing showing a side cut-away view of a tracking projectile launcher.
Figure 3:
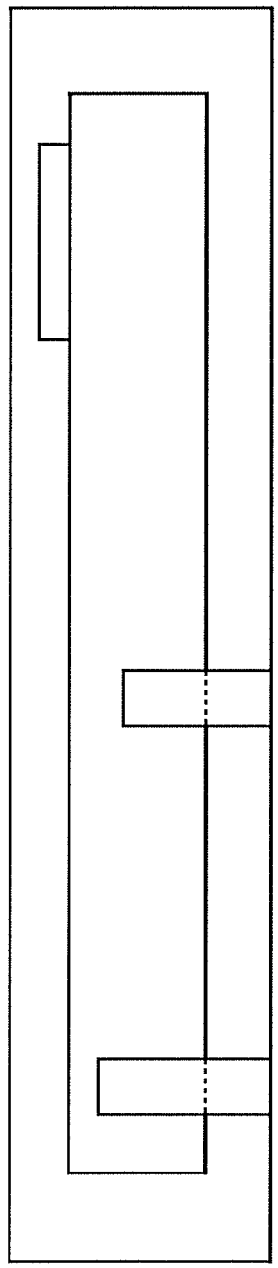
FIG. 3 is a alternate representation of the launcher in a fixed or static mount position
Figure 4:
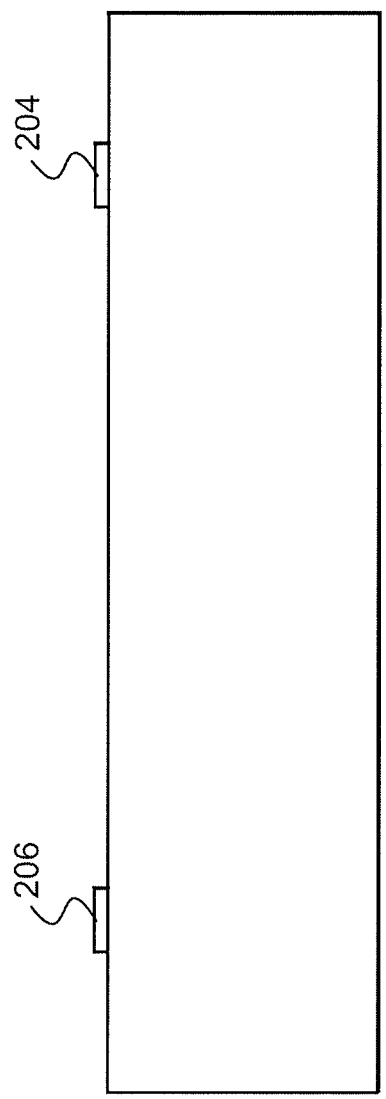
FIG. 4 is a drawing showing a top view of the launcher encased in the weatherproof box.

FIGS. 2-4 show the launcher 200 in greater detail. The launcher 200 is preferably, but not limited to, a pneumatic or CO2 gun, such as that commonly used with paintballs, and is modified to be placed behind the front grill of a police car.

FIG. 2 shows the launcher 200 in a sealed box 202 that protects it from the environment and other natural conditions such as rain, snow and dirt. The top of the box 203 preferably has latches 204 and 206 which provide access to the inside of the box, so that the launcher 200 may be repaired, cleaned or otherwise maintained. The launcher 200 is preferably, but not limited to, supported by an articulating joint 208 which is controlled by a servo motor. The launcher 200 may have one or more barrels 211 which stay within the confines of the weatherproof box. A laser pointer/range finder 212 is placed on top of the barrels 211 to identify the path of the projectile and to mark the target.

As the adjustable articulating joint 208 is moved down, the barrels 211 of the launcher 200 rotate upward. Similarly, if the adjustable articulating joint 208 is moved up, the barrels 211 of the gun rotate downward. In this way, the launcher 200 can be aimed at objects of different heights. The number of adjustments and manipulations necessary to operate the launcher 200 is limited to reduce the user's distractions. This makes the launcher 200 easier to operate in emergency situations when the user does not have the time to adjust multiple launcher 200 settings. Although this is the preferred embodiment of the invention, it should be understood that the invention could be modified to include multiple adjustment mechanisms for the launcher 200 without departing from the scope of the invention, to allow for greater versatility in its use. An example would be to have a universal servo mechanism at the rear of the launcher 200 so that its aim can be changed both up and down, and left and right.

FIG. 3 shows the launcher 200 in an alternate embodiment as a static mount or fixed position launcher 200 having a single barrel that uses neither elevation nor windage adjustment. It is envisioned that the launcher 200 would be mounted in any of the locations specified, but not limited to the mounting position indicated in FIG. 6. The single barreled launcher 200 preferably has a magazine to feed projectiles 300 into the launcher 200.

FIG. 4 shows a picture of the top of the sealed box 202 with hinges 206 and 204 to keep the box 202 securely closed to protect the launcher 200 from the elements and to provide a method of cleaning, servicing, and otherwise maintaining the launcher 200.

Figure 5:
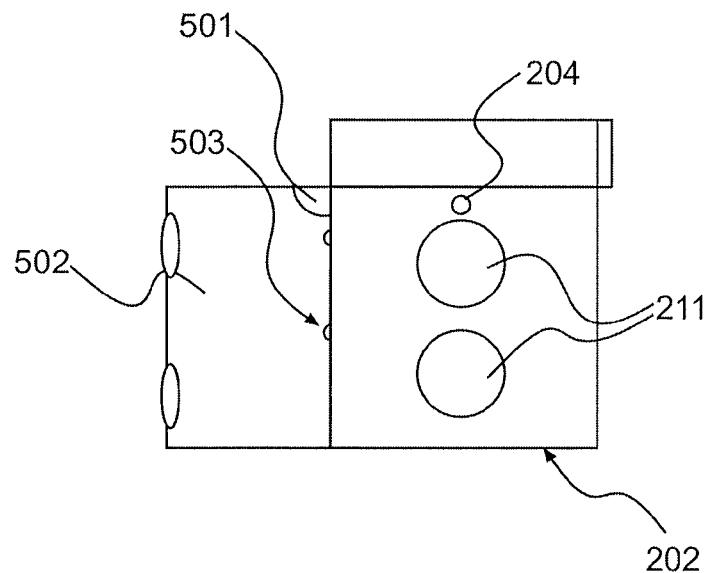
FIG. 5 is a drawing showing a front view of the launcher.

FIG. 5 shows the front of the launcher 200 with the barrels 211 secured on the inside of the box 202. The door 502 is preferably secured to the front of the weatherproof box 202 with hinges 501 and 503 that hold the watertight door 502 to the front of the weatherproof box 202.

Figure 6:
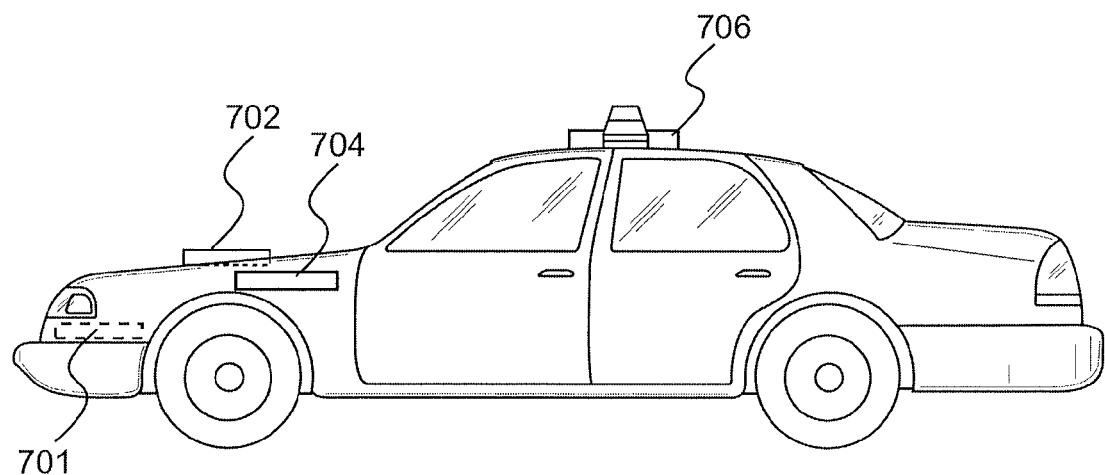
FIG. 6 is a drawing showing a police vehicle having the launcher mounted at various positions.

FIG. 6 shows several other possible locations for the launcher 200, such as on or under the hood of a car 702, on the side of a car 704, or on the roof of a car 706. These embodiments are provided for illustrative purposes and are not meant to limit the scope of the invention to the locations shown in FIG. 6. It will be apparent to one skilled in the art that modifications and variations may be made as to the mounting location of the launcher 200 without departing from the scope of the invention.

Figure 7:
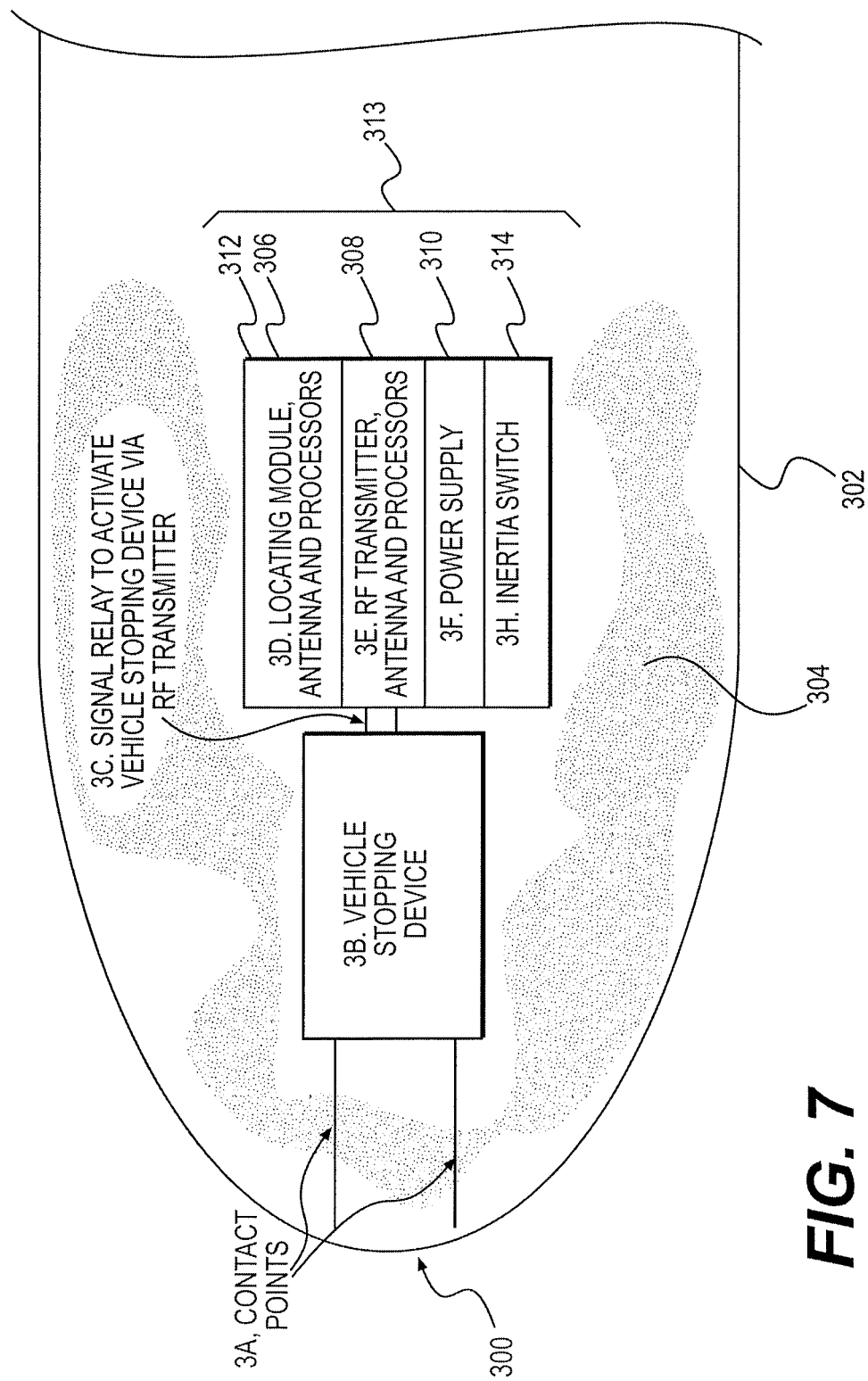
FIG. 7 is a drawing showing a cut-away view of the tracking projectile.

FIG. 7 shows a cut-away view of the projectile 300 of the preferred embodiment of the present invention. The projectile comprises an outer casing 302 preferably made of plastic, glass or other frangible material. The casing 302 must be strong enough to withstand the force of being fired from the launcher 200, but must be fragile enough so that it shatters upon impact with the target 102. Inside the casing 302 is a gelatinous adhesive compound 304 which holds a GPS receiver 306, a radio frequency (RF) transponder 308, a battery 310, an antenna 312 and an inertia or pressure switch 314. These electronic components are preferably placed on a single electronic component or chip 313. The adhesive material 304 is used to attach the chip 313 to a fleeing vehicle or target and can be any material that helps to absorb the shock generated by the firing of the launcher 200 and the impact with the target, yet also has a cure rate that ensures that the electronic chip 313 sticks to the target 102. The adhesive 304 must also be able to maintain its adhesive properties in a variety of environmental conditions, such as extreme heat, extreme cold, wet weather, etc. Examples of such adhesives are SUPER GLUE® GEL, product number 05111135-08751 and SUPER STRENGTH ADHESIVE, product number 051131-50096, available from the 3M Company. Although specific examples of the adhesive have been given, it should be understood that any adhesive that meets the requirements of the present invention may be used.

Contained in the adhesive mixture 304 is the electronic chip 313. In the preferred embodiment, the electronic chip 313 is initially in an "off" position to conserve the power in the battery 310. It is connected to the pressure or inertia switch 314 which turns the chip "on" due to the force generated by the firing of the launcher 200 or the impact with the target vehicle 102. Once the chip 313 is turned "on," the GPS receiver 306 begins to receive signals from terrestrial satellites to determine its location and conveys that information to the RF transponder 308. The RF transponder then transmits the information to law enforcement at a central command station who track the fleeing vehicle and direct field officers to its location. Alternatively, the RF transponder 308 may transmit the location of the target vehicle directly to the officer who fired the gun 200 or any other authorized personnel.

Figure 9:
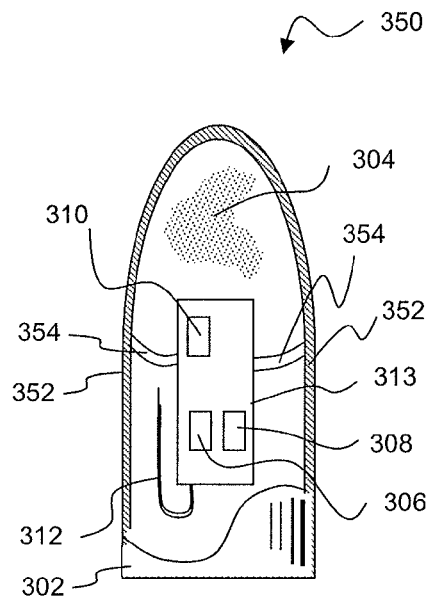
FIG. 9 is a cross-sectional view of an alternate embodiment of a tracking projectile as used in the present invention.

In yet another embodiment of the invention shown in FIG. 9, the electronic chip 313 in the projectile 350 is constantly powered or "on." This eliminates the need for the inertia switch 314; however, it requires a means for the battery 310 to be charged so that it has enough energy to power the electronic chip 313 after being fired. The projectile 350 of FIG. 9 is therefore provided with metal contacts 352 along its sides which are connected to the battery 310 by wires 354. Corresponding metal contacts in the clip of the launcher 200 (not shown) contact the metal contacts 352 of the projectile to charge the battery 310 from an external power source. Alternatively, the projectile 350 may be kept in a separate battery charging device until just prior to use so that it is fully charged when fired from the gun. It should be understood that other means of charging the battery 310 of the projectile 350 are available, and that the embodiment described above is not meant to limit the scope of the invention.

Figure 10:
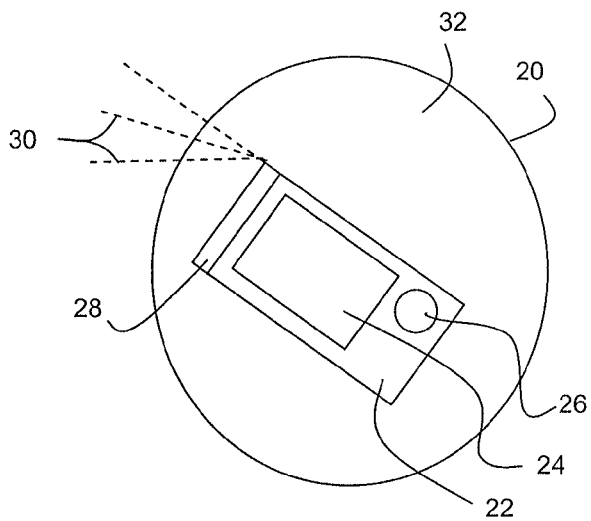
FIG. 10 is a cross-sectional view of an alternate embodiment of a tracking projectile as used in the present invention.
Figure 11:
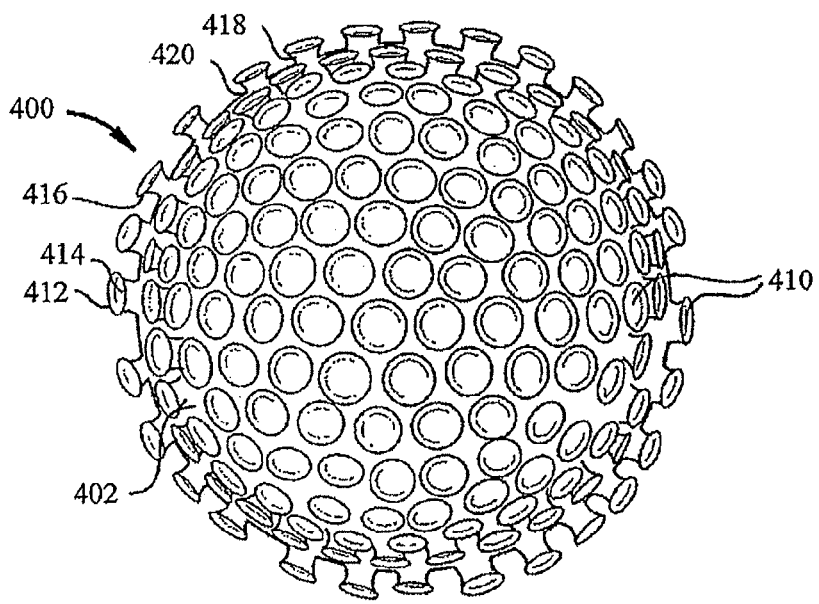
FIG. 11 is a perspective view of an alternate embodiment of a tracking projectile as used in the present invention.

In an alternative embodiment shown in FIG. 10, rather than using a frangible casing and adhesive, the tracking device, sensors and/or disabling system are embedded within a carrier 32. The carrier 32 is a pliable, highly sticky mass, which has the approximate shape and size of a baseball. When fired from the launcher 200, the carrier adheres to a target. Alternatively, as shown in FIG. 11, the carrier 400 is ball-shaped, but the outer surface 402 has suction cups 410 attached to it. Each suction cup 410 comprises a flexible cup-shaped body member 412 having an inside cup portion 314 and an outside cup portion 316. Outside cup portion 316 is attached to a neck 318 which in turn is connected to ball outer surface 302 by a base 320. The tracking device, sensors and/or disabling system are contained within the carrier 300, and the carrier 300 is launched from launcher 200 as previously described. When the carrier 300 impacts on the surface of a target, it adheres to the target's surface by one or more of the cup-shaped body members 312, thereby tagging the target.

Figure 12:
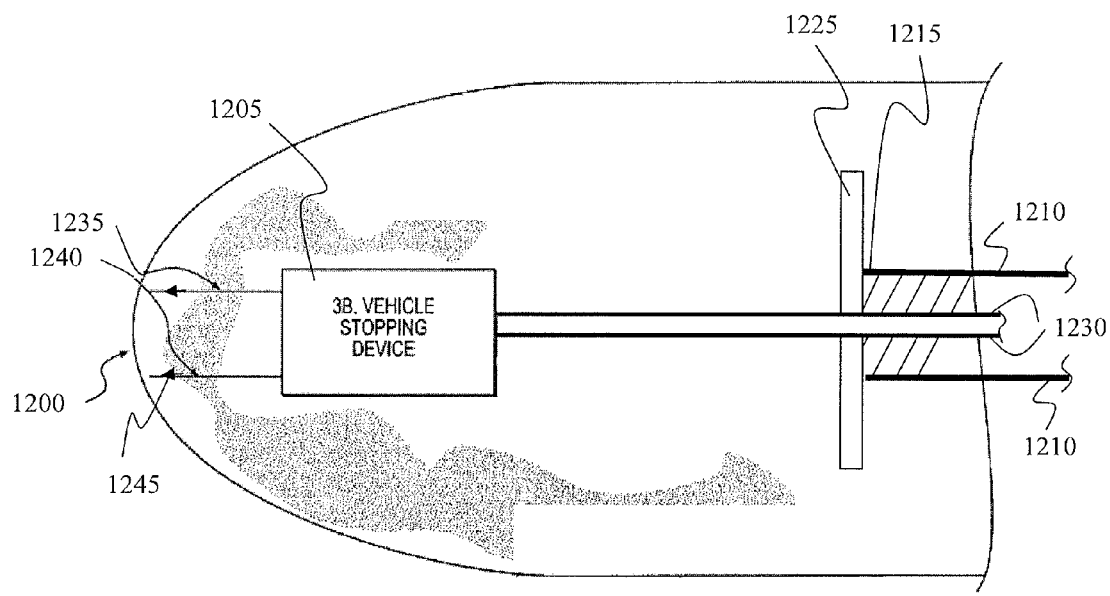
FIG. 12 is a drawing showing a cut-away view of an alternative embodiment of a carrier projectile with tether.
Figure 13:
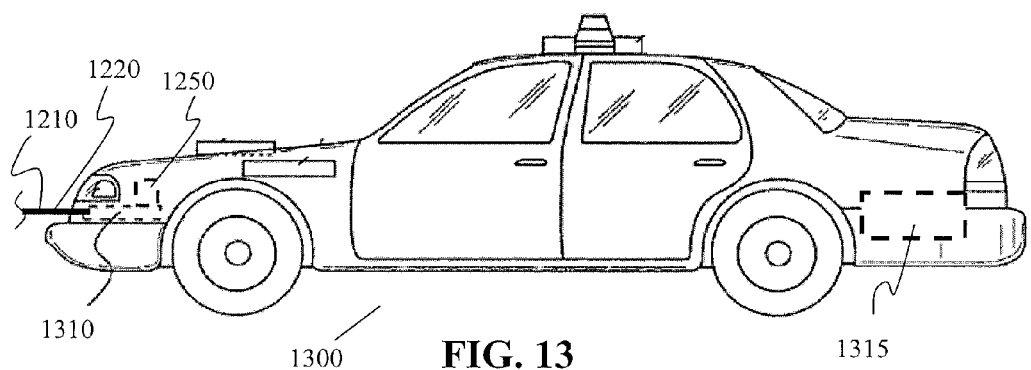
FIG. 13 is a drawing showing a police vehicle having a launcher mounted for a carrier projectile with a tether.

Shown in FIGS. 12 and 13 is another embodiment of the invention, a carrier 1200 containing a disabling system 1205 is provided with a tether 1210. As in previous embodiments, the vehicle disabling system 1205 can be configured to deliver an electromagnetic discharge, electrical burst, or arresting electric pulse to the target vehicle (not shown). In one embodiment, the vehicle disabling system 1205 is configured to deliver a disabling discharge of electric current. A first end 1215 of the tether 1210 is secured to the carrier 1200 and a second end 1220 is secured to the pursuit car 1300. The tether 1210 may be attached to a spool or reel 1310 on the pursuit car 1300. The carrier 1200 may include an anchor 1225 to facilitate secure attachment of the carrier 1200 to the tether 1210. A power supply 1310 configured to supply electrical power to the vehicle disabling system 1205 may be located on the pursuit car 1300 or on a handheld launcher (not shown). The tether 1210 is configured to serve as a conduit for transmitting electrical power to the vehicle disabling system 1205 from the power supply 1315. By locating the power supply 1315 for the vehicle disabling system 1205 on or within the pursuit car 1300 (or on a handheld launcher) rather than within the carrier 1200, the use of a larger and more powerful power supply 1310 is facilitated. The tether 1210 can comprise, for example, one or more electrically-insulated conductive wires (shown as two wires 1230. The two wires 1230 can be attached to respective first electrode 1235 and second electrode 1240 of the vehicle disabling system 1205. In certain embodiments, the first and second electrodes [1235, 1240] can include one or more barbs 1245 configured to puncture a surface of the target vehicle and facilitate attachment thereto. In other embodiments, only a single electrode is used. A controller 1250 for the vehicle disabling system 1205 can be provided that is configured to modulate the voltage and/or amperage that is delivered to the electrodes [1235, 1240]. The voltage and/or amperage can be modulated in a manner designed to maximize disruption of the target vehicle's electronic systems. The controller 1250 can be located within the carrier 1200 or disposed on the pursuit vehicle 1300.

In certain embodiments that utilize a tether 1210, the carrier 1200 may also include one or more sensors and/or a tracking system in the controller 1250 as described above. In other embodiments, these elements may not be included and the system may be designed to function solely as a vehicle disabling system 1205. In certain embodiments, the tether 1210 may be designed to break away from the carrier 1200 and/or be controllably releasable from the carrier 1200 under certain circumstances. For example if operation of the vehicle disabling system 1205 fails to disable the target vehicle, it may be desirable to allow the carrier 1200 to remain secured to the target vehicle in order to permit continued tracking of the target vehicle's location and/or monitoring of contraband or other substances of interest via the use of one or more sensors.

It is envisioned that the invention will be used in two primary situations. The first is when an officer has pulled a suspect over to the side of the road to investigate whether a crime or other violation has occurred. In this situation, the officer aims the launcher 200 by using the laser pointer 213 and manipulating the articulating joint 208. He then aims the laser pointer 213 at an appropriate flat surface on the target vehicle 102. Before exiting his car, the officer preferably activates a toggle switch which powers the trigger and clears the barrel of the gun so that it is ready to be fired. If the suspect attempts to flee, the officer may fire the gun with a portable trigger button that he is carrying. In the second situation, the officer is pursuing a suspect in a fleeing vehicle. Here, he fires the gun using the same process as the first, except that instead of firing the gun using the portable trigger, the officer fires the gun by closing in on the fleeing vehicle and pressing a trigger button from inside his vehicle. In both situations, the vehicle is tracked remotely, from a vehicle or a central command center, eliminating the need to chase the vehicle.

Figure 8A:
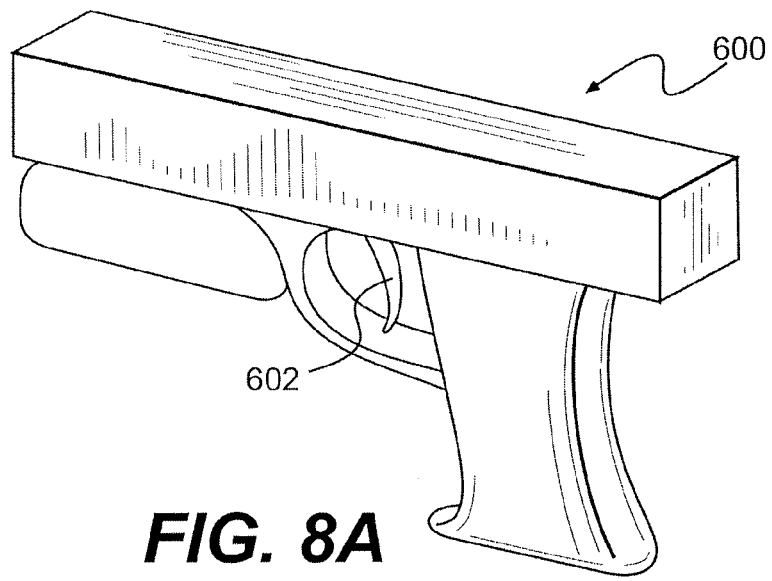
FIG. 8a is a perspective view of a handheld launcher.
Figure 8B:
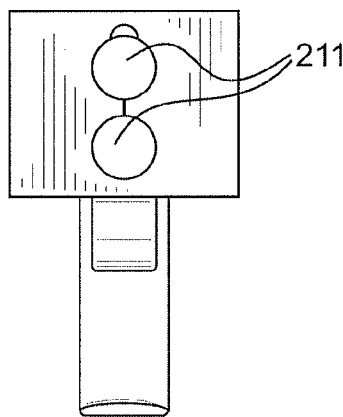
FIG. 8b is a front view of a handheld launcher.

In yet another embodiment of the invention, a handheld gun may be used to launch the tracking projectile. The handheld device may be based on either a pneumatic or shotgun launcher, and allows the operator greater flexibility in aiming and shooting potential targets. FIGS. 8*a* and 8*b* show a handheld pneumatic gun 600 similar to the mounted launcher 200 shown in FIG. 2. The tracking projectiles 300 may be gravity fed into the gun 600 or may be loaded via a spring clip. The gun 600 is aimed by simply pointing the gun at the intended target and is fired by pulling the trigger 602. The "charge" is preferably provided by a gas canister attached to the gun.

Figure 8C:
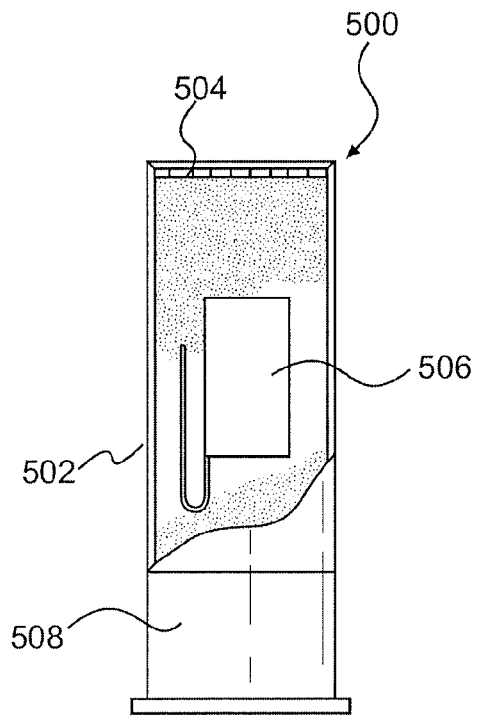
FIG. 8c is a cross-sectional view of an alternate embodiment of a tracking projectile as used in a handheld launcher.

In place of the pneumatic power gun described above, a shotgun-based gun may be used. This requires the use of a modified shotgun shell projectile 500, as shown in FIG. 8*c*. An explosive charge 508 is contained in an end of the shotgun shell 500 to provide the power to propel the shell 500. The shotgun shell 500 is encased in an outer plastic sabot sheath 502 as it is propelled from the barrel of the gun, and is released by the sabot sheath 502 as it exits the barrel. Although only pneumatic and shotgun launchers have been disclosed, any type of gun able to propel the tracking projectile could be used, and the invention is not intended to be limited to these two embodiments.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method for tagging a target vehicle for the purpose of deploying an electrical charge to incapacitate the vehicle, the method comprising:
   providing a pursuit vehicle with a launcher having at least one barrel, a carrier having an electronics package, a tether having a first end attached to the carrier and a second end attached to the pursuit vehicle, the launcher being configured to launch the carrier in order to affix the carrier to a fixed or moving target at a range, the carrier electronics package having a vehicle stopping system;
   providing the pursuit vehicle with a power supply configured to supply power to the vehicle stopping system via said tether;
   sighting the target vehicle using a target acquisition device;
   launching the carrier from the launcher towards the target vehicle;
   attaching the carrier, with the electronics package within the carrier, to the target vehicle, thereby tagging the target vehicle;
   providing a remote actuator for stopping the target vehicle using the vehicle stopping system, the vehicle stopping system being configured to discharge electricity to incapacitate the target vehicle;
   providing the electronics package with a tracking device configured to emit a tracking signal containing information regarding the target vehicle's location;
   receiving the tracking signal emitted by the tracking device;
   converting the received tracking signal into an image of the tagged target vehicle; and
   providing the electronics package with at least one sensor configured to detect the presence of one or more substances of interest; and transmitting sensor data collected from the at least one sensor.

2. The method of claim 1, further comprising: receiving the tracking signal and sensor data at a static location using a computer system selected from the group of static computer, networked computer, mobile computer, handheld computing device, and cellular phone.

3. The method of claim 1, wherein the target vehicle is selected from the group of an automobile, a trailer, a trailer attached to a tractor trailer truck, a boat, an aircraft, a military vehicle, a motorcycle, an off terrain vehicle.

4. The method of claim 1, wherein the tracking signal comprises information from a global positioning system.

5. The method of claim 1, wherein the tether comprises first and second electrically-insulated conductive wires.

6. The method of claim 1, wherein the vehicle stopping system includes first and second electrodes configured to contact a surface of the target vehicle.

7. A tagging device for tagging a target vehicle, the tagging device comprising:
   (a) a vehicle stopping technology, said vehicle stopping technology being configured to deliver an electrical charge to incapacitate the target vehicle;
   (b) an attachment means for attaching the tagging device to the target vehicle, wherein the attachment means is configured to be shot from a remote launcher and is capable of adhering to a target vehicle, the attachment means containing an electronics package therein, such that when the attachment means attaches to the target vehicle, the electronics package contained therein is not damaged;
   (c) a tether for connecting the tagging device to a pursuit vehicle, the tether configured to serve as a conduit for electrical power delivered to the vehicle stopping technology from a power supply disposed on the pursuit vehicle;
   (d) wherein the tagging device is configured to receive a vehicle stopping signal which is transmitted from a remote actuator;
   (f) the electronics package with a tracking device configured to emit a tracking signal containing information regarding the target vehicle's location;

(g) a receiver configured to receive the tracking signal emitted by the tracking device;
(h) converts the received tracking signal into an image of the tagged target vehicle;
(i) the electronics package with at least one sensor configured to detect the presence of one or more substances of interest; and
(j) a transmitter configured to transmit the sensor data collected from the at least one sensor.

8. The tagging device of claim 7, wherein the attachment means has an outer surface.

9. A tracking system comprising:
(a) a tracking device comprising
a tracking chip having a microprocessor, an antenna, a power source, and an emitting system for emitting a tracking signal, the tracking signal emitted including a unique representation of the tracking chip;
an attachment means for attaching the tracking device to a target vehicle such that the tracking device is adhered to the target vehicle, the attachment means containing the tracking chip therein, such that when the attachment means attaches to the target vehicle, an electronics package contained therein is not damaged, wherein the tracking device further comprises a vehicle stopping device that discharges electricity to incapacitate the target vehicle, the vehicle stopping device is contained within the attachment means, and wherein the tracking device is linked to a pursuit vehicle via a tether, the tether configured to transmit electrical power to the vehicle stopping device from a power supply located on the pursuit vehicle;
(b) a launching device having at least one barrel capable of receiving the tracking device and a source of pressure to expel the tracking device from the barrel to the target vehicle;
(c) a receiver system comprising a receiver capable of receiving the tracking signal and an interpretation device for interpreting the received tracking signal to identify the tracking chip and to represent the location of the tagged target vehicle;
(d) a display in communication with the receiver system and responsive to the interpreted tracking signal from the receiver system so as to provide a visual image of the location of the target vehicle; and
(e) a controller system having a controller, an input device, and a transmitter, the controller system in communication with the receiver system, and wherein the controller system is capable of transmitting a signal to activate the vehicle stopping device.

10. The system of claim 9, wherein the controller system further comprises an actuator for arming the tracking device and a firing means for firing the tracking device, the actuator adapted, upon launching of a tracking device from the launching device, to cause the tracking device to emit the tracking signal.

11. A system for tagging, tracking, and disabling a target vehicle, the system comprising:
(a) a tracking device comprising
a tracking chip having a microprocessor, an antenna, a power source, and an emitting system for emitting a tracking signal, the tracking signal emitted including a unique representation of the tracking chip;
at least one onboard data gathering sensor to detect substances, the sensor in communication with the emitting system for inclusion of sensor data within the tracking signal;
a vehicle stopping device that discharges electricity to incapacitate the target vehicle;
an attachment means for attaching the tracking device to the target vehicle, the attachment means containing the tracking chip, sensor, and vehicle stopping device therein, the attachment means is capable of adhering to the target vehicle, such that when the attachment means attaches to the target vehicle, the tracking chip contained therein is not damaged;
a tether for linking the tracking device to a pursuit vehicle, the tether serving as a conduit for the delivery of electrical power to the vehicle stopping device from a power supply disposed on the pursuit vehicle;
(b) a launching device having at least one barrel capable of receiving the tracking device and a source of pressure to expel the tracking device from the barrel;
(c) a receiver system comprising a receiver capable of receiving the tracking signal and an interpretation device for interpreting the received tracking signal and sensor data to identify the tracking chip and to indicate the location of the tracking chip such that when the tracking device is adhered to a target vehicle the tracking signal represents the location of the tagged target vehicle, and further for interpreting the sensor data;
(d) a display in communication with the receiver system and responsive to the interpreted tracking signal and sensor data from the receiver system so as to provide a visual image of the location of the target vehicle and sensor data; and
(e) a controller system having a controller, an input device, and a transmitter, the controller system in communication with the receiver system, capable of transmitting a disabling signal to activate the vehicle stopping device in response to the receiver system receiving a tracking signal and sensor data that meet a predetermined set of parameters.

* * * * *